United States Patent [19]

Suzuki et al.

[11] Patent Number: 4,858,265

[45] Date of Patent: Aug. 22, 1989

[54] CLEANING APPARATUS FOR MAGNETIC TAPE

[75] Inventors: Akihiro Suzuki; Akira Takagi, both of Kanagawa, Japan

[73] Assignee: Fuji Photo Film Co., Ltd., Kanagawa, Japan

[21] Appl. No.: 247,209

[22] Filed: Sep. 21, 1988

[30] Foreign Application Priority Data

Sep. 21, 1987 [JP] Japan ................... 62-234952

[51] Int. Cl.⁴ .................. G11B 3/58; B08B 11/00
[52] U.S. Cl. ..................... 15/100; 15/102; 51/135 R
[58] Field of Search ............ 15/97 R, 100, 102, 1.5; 51/135 R, 140

[56] References Cited

U.S. PATENT DOCUMENTS 4,213,222  7/1980  Schoettle et al. ................ 15/100

Primary Examiner—Edward L. Roberts
Attorney, Agent, or Firm—Sughrue, Mion, Zinn, Macpeak & Seas

[57] ABSTRACT

An apparatus for cleaning the edges of a magnetic tape cut into final-product widths from a wide raw material web with which magnetic powder shed from the tape and base film dust breaking off in the cutting process are removed without damage to the tape. The apparatus includes an air bearing guide for floating the magnetic tape as it is transported thereon, a cleaning device positioned at a side of the guide and making contact with at least one edge of the magnetic tape, and a magnet device for urging the edge of the tape into close contact with the cleaning device.

6 Claims, 1 Drawing Sheet

CLEANING APPARATUS FOR MAGNETIC TAPE

BACKGROUND OF THE INVENTION

The present invention relates to a cleaning apparatus for magnetic tape, and more particularly to a cleaning apparatus for magnetic tape cut from a wide raw material web of magnetic tape into a magnetic tape in final-product form in a specific width.

Recently, magnetic tape has been widely used in many fields following improvements in various performance characteristics thereof. Magnetic tape is usually initially manufactured in the form of a wide raw material web of which is much wider than the magnetic tape of the final product. The wide raw material web is cut into magnetic tapes of specified predetermined widths in a cutting process.

In the cutting process, an apparatus to cut the wide raw material web of magnetic tape is obviously required. The product quality of the final product is strongly affected by the cutting quality, namely, by the accuracy and neatness of the cutting process. That is to say, if the cutting quality is poor, dust particles, which result from the shedding of magnetic powder or tape base material from the cut edges of the tape, may be generated in significant amounts. The dust particles are carried on the surface of the cut magnetic tape, causing many kinds of problems during usage such as signal drop-out during recording and reproducing or head clogging in the recording-reproducing apparatus. Moreover, even if such dust particles are not shed, depending upon the amount of deterioration of the cutting quality, the surface accuracy of the cut edges may be unacceptable, and the same problems such as occur in the case of dust particle generation arise during recording and reproducing.

Techniques have been proposed to remove the dust particles from the surface of the magnetic tape. A cleaning apparatus for magnetic tape such as disclosed in U.S. Pat. No. 4,213,222 has been applied to clean the surface of a tape by means of an unwoven material and a magnet after the tape has been cut into the predetermined width. As this apparatus was merely applied to clean the front and back surfaces of the cut tape, it was easy to ensure close contact between the cleaning device and the tape surface to be cleaned, even if the contact pressure exerted by the magnet on the tape was only roughly adjusted.

However, employing a cleaning apparatus of this kind to clean the tape edges is accompanied by another problem, namely, the pressure in the transverse direction used to achieve contact between the edges of the magnetic tape and the cleaning device cannot be satisfactorily regulated to hold the position of the tape edges within a desired range of tolerance. These pressure variations are due to variations in the tape tension during tape transport and fluctuations in the amount of friction between the magnetic tape and the tape guides. The edges of the tape can be damaged if the contact pressure between the edges and the cleaning device is too strong, and cleaning cannot be properly achieved if the contact pressure is too weak.

Especially for magnetic tapes used for video recording and reproduction, since the audio signal and the tracking signal must be recorded in side portions of the tape surface near the tape edges, the tape edge quality is very important to fully realize good tape performance.

SUMMARY OF THE INVENTION

It is therefore an object of the present invention to provide a cleaning apparatus for magnetic tape which can solve the problems related to the shedding of magnetic powder and base film dust which breaks off in the cutting process and tape edge damage caused during the cleaning process so as to manufacture magnetic tape with superior reliability.

In accordance with the above and other objects of the present invention, there is provided a cleaning apparatus for magnetic tape characterized by comprising:

(a) an air bearing guide which floats the magnetic tape in order to transport the tape thereon, (b) cleaning means positioned at the side of the air bearing guide to make contact with at least one edge of the magnetic tape, and (c) a magnet which causes the at least one edge of the tape to closely contact the cleaning means.

BRIEF DESCRIPTION OF THE DRAWINGS

The cleaning apparatus in accordance with the present invention will be discussed in more detail below with reference to the accompanied drawings in which.

DESCRIPTION OF THE PREFERRED EMBODIMENTS

Figure 1:
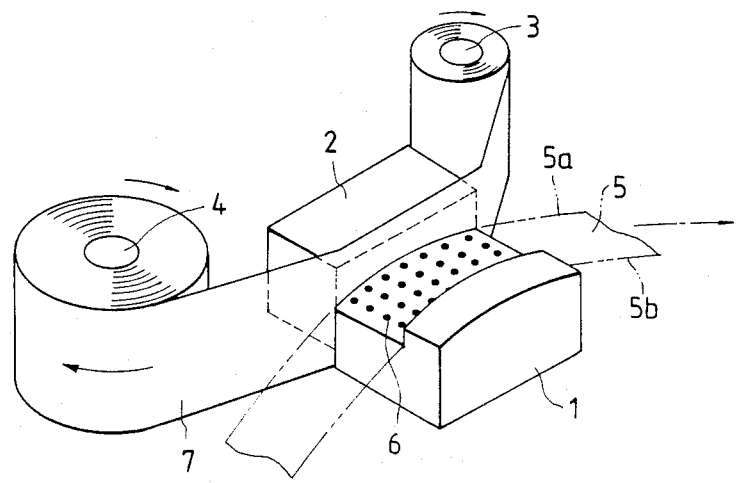
FIG. 1 is a schematic overall oblique view of a preferred embodiment of a cleaning apparatus of the present invention.
Figure 2:
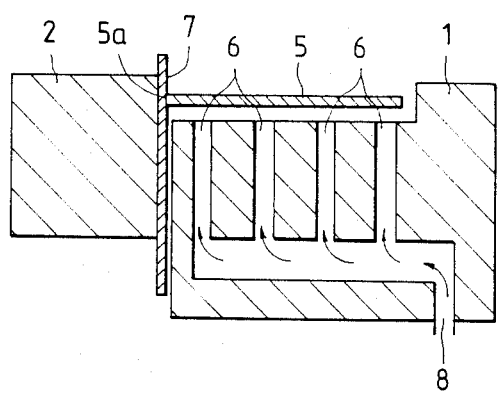
FIG. 2 is a cross-sectional view of the cleaning apparatus of FIG. 1.

As shown in FIGS. 1 and 2, an air bearing guide is supplied with air into an air inlet 8 introduced from an air supplying device such as a compressor (not shown). The air is blown from the outlet holes against a magnetic tape 5 which is passing thereon. Of course, the air bearing guide is not restricted to the example shown in FIGS. 1 and 2. For instance, the air bearing guide may be made from a porous sintered metal having a large number of small holes.

The cleaning material may be formed by a strip-like materials such as a long unwoven fabric 7, for example, which is transported while contacting an edge 5a of the magnetic tape 5. That is, rolled unwoven fabric 7 from a supply roll 3 is taken up at an appropriate speed onto another roll 4 while contacting the edge 5a of the magnetic tape 5. Furthermore, a permanent magnet 2 is positioned with the unwoven fabric on the opposite side of the tape edge 5a to attract the magnetic tape 5 while it is being transported under a floating effect by the air bearing guide 1 in order to achieve close contact with the unwoven fabric 7. Although the transport direction of the unwoven fabric 7 is preferably opposite to that of the magnetic tape, the spirit and scope of the present invention are not restricted in this specific example. For example, a lapping tape containing abrasive powder with an average diameter of 0.1 to 2.0 μm can also be used as the cleaning device instead of the unwoven fabric of the above example.

A cleaning apparatus constructed in accordance with the present invention can stably achieve the desired contact between tape edge 5a and the unwoven fabric 7 due to the floating effect caused by the air bearing guide 1 and the attractive force of the permanent magnet 2 simultaneously stabilizing the edge movement in the transverse direction. As a result, the occurrence of tape edge damage is prevented, thereby meeting the objects of the invention.

Also, an electromagnet can be used in the practice of the present invention instead of the permanent magnet 2. In the case of an electromagnet, the contact pressure between the magnetic tape 5 and the unwoven fabric 7 can easily be controlled by adjusting the voltage supplied to the electromagnet in accordance with variations in the magnetic tapes and the transport velocity.

Moreover, although in the above example the transport direction of the unwoven fabric 7 is parallel to that of the magnetic tape 5, the spirit and the scope of the present invention are not merely restricted to this specific example. For example, the transport direction of the unwoven fabric 7 and that of the magnetic tape 5 can be made oblique to one another in order to widen the contact area between the unwoven fabric 7 and the magnetic tape 5. In such a case, the unwoven fabric surface is more effectively used, and contact between a fresh surface of the unwoven fabric and the edge of the magnetic tape is kept all the time. Hence, a much better cleaning effect is achieved.

The cleaning apparatus of the above example can provide magnetic tape products of good quality and condition through continuous manufacturing processes such as a cutting process in which the raw material tape web is cut into magnetic tapes 5 of predetermined width, a winding process in which the cut tape is taken up onto rolls of a long length, and a cleaning process in which dust particles generated in the former cutting process are removed by the cleaning of the tape edges.

Although in the above example cleaning of the tape edges is achieved for only one tape edge, the spirit and the scope of the present invention again are not restricted to this specific example. For example, another cleaning apparatus including an air bearing guide, permanent magnet and unwoven fabric can be employed to clean the other tape edge 5b in a continuous process.

A stable tape edge cleaning process is achieved because the cleaning apparatus in accordance with the present invention can achieve the desired contact under stable conditions between the tape edges and the unwoven fabric due to the flotation of the tape provided by the air bearing guide and the attracting effect cause by the magnetic force of the permanent magnet. Accordingly, with the invention magnetic tapes of good reliability can be manufactured without the occurrence of problems such as drop-out due to shedding of magnetic powder or tape base material from the tape edges in the cutting process, or tape edge problems caused by the cleaning apparatus.

What is claimed is:

1. A cleaning apparatus for magnetic tape, comprising:
   (a) air bearing guide means for floating a magnetic tape transported thereon;
   (b) strip-like cleaning means positioned at a side of said guide and making contact with at least one edge of said magnetic tape;
   (c) magnet means for urging said edge of said tape into close contact with said strip-like cleaning means; and
   (d) driving means for transporting said strip-like cleaning means with a predetermined speed.

2. The cleaning apparatus for magnetic tape as claimed in claim 1, wherein both the running direction of said strip-like cleaning means and said magnetic tape are oblique with respect to one another.

3. The cleaning apparatus for magnetic tape as claimed in claim 1 or 2, wherein said magnet means comprises an electromagnet.

4. The cleaning apparatus for magnetic tape as claimed in claim 1 or 2, wherein said magnet means comprises a permanent magnet.

5. The cleaning apparatus for magnetic tape as claimed in claim 1, wherein said strip-like cleaning means comprises an unwoven fabric.

6. The cleaning apparatus for magnetic tape as claimed in claim 1, wherein said strip-like cleaning means comprises a lapping tape.

* * * * *